April 9, 1929. J. J. KILBRIDE 1,708,728
CLEANING DEVICE FOR EYEGLASS LENSES
Filed Oct. 22, 1927
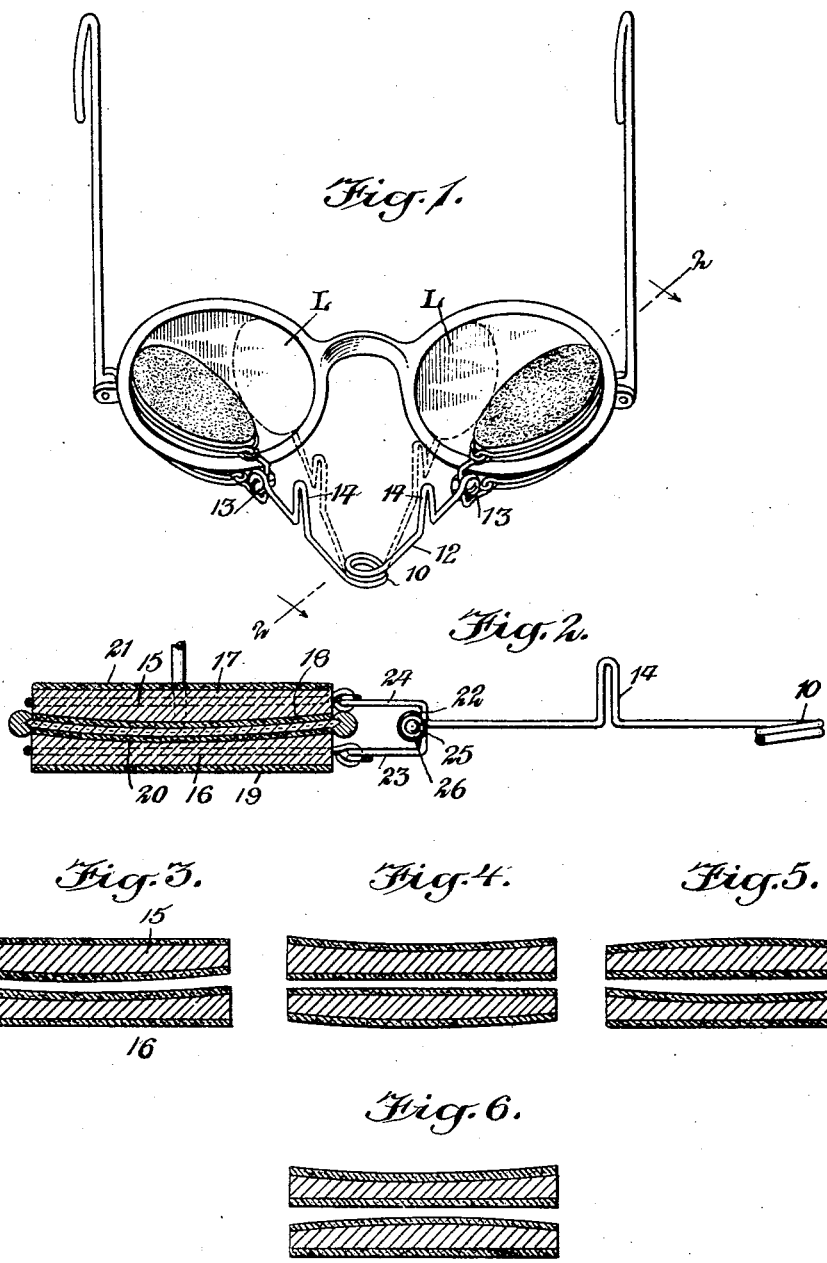
WITNESSES
INVENTOR
John J. Kilbride
BY
ATTORNEY Patented Apr. 9, 1929.

1,708,728

UNITED STATES PATENT OFFICE.

JOHN J. KILBRIDE, OF SCOTCH PLAINS, NEW JERSEY.

CLEANING DEVICE FOR EYEGLASS LENSES.

Application filed October 22, 1927. Serial No. 227,925.

This invention relates to cleaning devices for eyeglass lenses and comprehends a device by virtue of which the cleaning operation of both surfaces of both lenses may be accomplished simultaneously.

The invention furthermore comprehends in a cleaning device for eyeglass lenses, a pair of cleaning elements for each lens, and a common means for supporting the pairs of cleaning elements in juxtaposition to the lenses for movement thereover.

The invention furthermore comprehends a supporting device for the lens-cleaning elements with which said elements are removably associated to permit of relative positioning of the same and to allow for renewal of the elements when worn or unfit for further use.

Other objects reside in the simplicity of construction and mode of operation of the device, the economy with which the same may be produced, and the general efficiency derived therefrom.

With the above recited and other objects in view, reference is had to the following description and accompanying drawings in which there is exhibited one example or embodiment of the invention, while the appended claims define the actual scope of the invention.

In the drawings:—

Figure 1 is a perspective view of a lens-cleaning device constructed in accordance with the invention and illustrating the same in use;

Fig. 2 is an enlarged sectional view therethrough taken approximately on the line 2—2 of Fig. 1;

Figs. 3, 4, 5 and 6 are diagrammatic sectional views of the various arrangements of the pairs of cleaning elements to render the same capable of use in connection with lenses having surfaces of different characters.

Referring to the drawings by characters of reference, the cleaning device includes a strip of material preferably spring wire, which is bent intermediate its length into a spring coil 10 from which arms 11 and 12 diverge with terminals 13 bent into eye form. Between the intermediate spring coil terminal 10 and the terminals 13, each arm is provided with an offset 14 constituting a finger-engaging and manipulating means, the purpose of which will be hereafter set forth.

A pair of cleaning elements is provided for each lens L of a pair of eyeglasses, and said cleaning elements consist respectively of pads 15 and 16, the former having a flat surface 17 and a convex surface 18, and the latter having a flat surface 19 and a concave surface 20. The surfaces are respectively covered with a suitable covering material 21, such as chamois. The cleaning elements are supported and attached to the terminal eyes 13 of the arms 11 and 12, by substantially U-shaped spring frames which are constructed from a single length of material, such as spring wire which is coiled intermediate its length at 22 and provided with substantially parallel arms 23 and 24, each of which is bent in loop form 25 to frictional fit the contour of the cleaning elements 15 and 16. The intermediate coiled portion 22 of each supporting frame is alined with the terminal eye 13 of the arms 11 and 12, and a bolt 25 and nut 26 are employed for attaching the frame members to the arms.

The surface configuration of each pair of cleaning elements admits of relative arrangements of the same to coincide with the surface configuration of lenses of various characters. For instance, when the elements 15 and 16 are arranged as illustrated in Fig. 3, they will coincide with a lens which is provided with a convex surface and a concave opposite surface. When arranged as illustrated in Fig. 4, they will coincide with a lens having opposite flat surfaces. When disposed in the relation shown in Fig. 5, they will coincide with a lens having a flat surface and a convex surface, and when disposed in the position illustrated in Fig. 6, they will coincide with a lens having a flat and a concave opposite surface.

When the cleaning elements are arranged in the loops 25 of each frame member to coincide with the configuration of the lens surfaces L, each pair of cleaning elements is engaged over the lens as illustrated in Fig. 1. The normal inherent spring quality of the device will dispose the divergent arms 11 and 12 in a position whereby the cleaning elements are arranged adjacent the outer edges of the lens. The operator by grasping the manipulating offset portions 14 in the fingers and exerting a pressure to move the arms 11 and 12 toward each other, will move the engaging surfaces of the cleaning elements over the lens surface to wipe and cleanse the same. In some instances it may be necessary to repeat the operation several times but ordinarily a complete movement back and forth will be sufficient to properly cleanse the lens surfaces.

What is claimed is:

1. A cleaning device for eyeglass lenses including a pair of cleaning elements for each lens and a common means for supporting the pairs of lens cleaning elements in juxtaposition to the opposite surfaces of the lenses for movement thereover, said supporting means comprising a spring handle member having normally divergent arms carrying U-shaped members having looped arms in which are mounted the cleaning elements.

2. A cleaning device for eyeglass lenses, comprising a pair of cleaning elements for each lens, said cleaning elements of each pair having surfaces of respectively different characters to coincide with the difference in the configuration of opposite lens surfaces, and a common means for selectively supporting the cleaning elements in juxtaposition to the lenses for movement thereover, the said supporting means including a spring handle member having normally divergent arms carrying U-shaped members having looped arms in which are mounted the cleaning elements.

3. A cleaning device for eyeglass lenses, comprising a pair of cleaning elements for each lens, said cleaning elements of each pair having surfaces of respectively different characters to coincide with the difference in the configuration of opposite lens surfaces, and a common means for selectively supporting the cleaning elements in juxtaposition to the lenses for movement thereover, the said supporting means including a spring handle member having normally divergent arms, U-shaped members having looped arms supporting said cleaning elements and which arms are detachably secured to and carried by the terminals of the handle arms.

Signed at New York in the county of New York and State of New York this 21st day of October, A. D. 1927.

JOHN J. KILBRIDE.